(12) United States Patent
Krishnan et al.

(10) Patent No.: US 9,398,067 B2
(45) Date of Patent: Jul. 19, 2016

(54) WEB-BASED SHARING OF DOCUMENTS

(75) Inventors: Parameshwaran Krishnan, Basking Ridge, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 983 days.

(21) Appl. No.: 11/676,938

(22) Filed: Feb. 20, 2007

(65) Prior Publication Data

US 2008/0201418 A1     Aug. 21, 2008

(51) Int. Cl.
*G06F 15/16*     (2006.01)
*H04L 29/08*     (2006.01)
*G06F 17/30*     (2006.01)
*H04L 29/12*     (2006.01)

(52) U.S. Cl.
CPC .......... *H04L 67/02* (2013.01); *G06F 17/30861* (2013.01); *G06F 17/30876* (2013.01); *G06F 17/30884* (2013.01); *H04L 61/30* (2013.01)

(58) Field of Classification Search
CPC ..................... G06F 17/30884; G06F 17/30887
USPC .................................................. 709/204, 217
See application file for complete search history.

(56) References Cited

U.S. PATENT DOCUMENTS

| | | | | |
|---|---|---|---|---|
| 6,631,496 B1* | 10/2003 | Li | .......... | G06F 17/30884 707/999.01 |
| 7,289,980 B2* | 10/2007 | Kogut-O'Connell | .......... | G06F 17/3089 |
| 7,487,508 B2* | 2/2009 | Fu | .......... | H04L 29/06 709/220 |
| 8,346,868 B2* | 1/2013 | Nakajima | .......... | H04L 29/06 709/203 |
| 2002/0029245 A1 | 3/2002 | Nahon et al. | | |
| 2002/0083035 A1* | 6/2002 | Pearl et al. | .......... | G06F 17/30861 |
| 2003/0046290 A1* | 3/2003 | Yamada | .......... | 707/10 |
| 2003/0204522 A1* | 10/2003 | Gallagher et al. | .......... | 707/102 |
| 2004/0255241 A1* | 12/2004 | Yamamoto | .......... | 715/511 |
| 2005/0021626 A1 | 1/2005 | Prajapat et al. | | |
| 2005/0097159 A1 | 5/2005 | Skidgel | | |
| 2006/0129642 A1 | 6/2006 | Qian et al. | | |
| 2008/0027914 A1* | 1/2008 | Caputo et al. | .......... | 707/3 |
| 2008/0086471 A1* | 4/2008 | Ritter et al. | .......... | 707/8 |
| 2008/0104195 A1* | 5/2008 | Hawkins et al. | .......... | 709/217 |
| 2008/0120382 A1* | 5/2008 | Heidloff | .......... | G06Q 10/107 709/206 |

* cited by examiner

*Primary Examiner* — Linglan Edwards
(74) *Attorney, Agent, or Firm* — Sheridan Ross P.C.

(57) ABSTRACT

A technique is disclosed that enables telecommunications endpoints to conveniently share the addressing information—that is, the Uniform Resource Identifiers (URI)—of documents that are available on the World Wide Web. In particular, a server is used to provide a bookmark service. The server acts as a repository of tag-URI pairs, in which each tag functions as a shorthand label for the corresponding URI. In the disclosed technique, a first user creates the tag for the intended URI by assigning a keyword to represent the URI as part of a bookmark tag-URI pair that the server stores. The created tag is presumably shorter than the URI that it represents, making the tag more convenient to use. A second user is then able to retrieve and use the URI by specifying the tag to the bookmark server. In essence, the technique of the illustrative embodiment enables the sharing of Web documents by sharing the bookmarks to those documents.

20 Claims, 7 Drawing Sheets

WEB-BASED SHARING OF DOCUMENTS

FIELD OF THE INVENTION

The present invention relates to telecommunications in general, and, more particularly, to sharing documents electronically between users.

BACKGROUND OF THE INVENTION

The World Wide Web is a system of interlinked, hypertext documents that operates via the Internet. With a Web browser, a user at a telecommunications endpoint is able to view Web documents such as Web pages and PDF documents, which typically contain text, images, or other multimedia. Viewing a Web page or other resource on the World Wide Web normally begins with either typing the Uniform Resource Identifier (URI) of the page into the browser, or following a hypertext link to that page or resource. A request is then sent to the Web server that corresponds to the typed or selected URI, requesting the resource, which is a Web document that represents the displayable Web page or other content. The browser then renders the page at the endpoint, incorporating the images and other resources as necessary. The rendering produces the on-screen page that the user is able to view on the endpoint's display.

Co-workers or other groups of collaborators routinely need to view the same Web documents as one another. In order to view the same documents, the collaborators, who are often at different telecommunications endpoints, have to provide the URI of each shared document to one other. The collaborators share the URI typically via instant messaging, via email, or verbally by telephone. Additionally, there are many software applications that enable cooperative or collaborative browsing, or "co-browsing," such as Liveperson, Apple's IChat, Kana's iCare Suite, Voxwire's Rooms, Pageshare, Orbitalk, Webconference, and WebeX. Typically, a desktop computer—having a full-size keyboard, a relatively large display, and optimal Web browsing capability—runs these applications that are often resource intensive.

Sharing the URI across certain types of endpoints—particularly endpoints other than a desktop computer—can prove at times to be inconvenient and unworkable. One such endpoint is a packet-based telephone with multimedia capability, which can provide voice-centric communications with browser support. Although a packet-based, multimedia phone is more enhanced than a voice-only phone in that it has browsing capability, the packet-based phone is often inferior to a desktop personal computer in terms of its user interface, browser, and so forth. For example, an Internet Protocol-based deskset, which is becoming more common in the workplace, might comprise a keypad, some function keys, an enhanced display, and a browser with rudimentary capability, at least in relation to that of a desktop computer browser; as a result, the deskset is not as capable as a desktop computer with respect to sharing Web documents. On these types of endpoints that have a limited user interface or browser capability, sharing a URI can be difficult because it involves typing a URI into a telephone keypad instead of a fully-capable keyboard, which amounts to a tedious and error-prone activity.

What is needed is a technique for improved Web-based document sharing that accounts for a wider variety of telecommunications endpoints, without some of the disadvantages in the prior art.

SUMMARY OF THE INVENTION

The present invention enables telecommunications endpoints to conveniently share the addressing information—that is, the Uniform Resource Identifiers (URI)—of documents that are available on the World Wide Web. Such Web documents, for example, represent Web pages that are displayable by a browser. In particular, a server is used to provide a bookmark service, in accordance with the illustrative embodiment of the present invention. The server acts as a repository of tag-URI pairs, in which the tag functions as a shorthand label for the corresponding URI. In essence, the technique of the illustrative embodiment enables the sharing of Web documents by sharing the bookmarks to those documents, as the tag is used to reference the URI and the URI points to the document of interest.

In the disclosed technique, a user at a first endpoint creates the tag for the intended URI by assigning a keyword to represent the URI as part of a bookmark tag-URI pair. The bookmark is registered and stored at the server along with other bookmarks, which means that tag must be unique within the address space of the server repository. The created tag is presumably shorter than the URI that it represents, is more easily remembered than the URI, or in some other way is preferable to use. A user at a second endpoint is then able to retrieve and use the URI by specifying the tag to the bookmark server. Additional users may be provided with access to the same tag-URI pair, and each particular user might have access to multiple tag-URI pairs.

In some embodiments, instead of storing only a URI with each tag, the bookmark server receives and stores (i) the target World Wide Web document itself, which might be represented by one or more individual files, or (ii) the Web document, along with at least some of the information needed to reconstruct the document at the bookmark server or at another endpoint. Storing the actual document, possibly with additional and related information, addresses the problem posed by a URI that is insufficient by itself to reconstruct the target Web document at another endpoint. As a first example, to view a Web page that a user at a first endpoint was viewing, the browser at a second endpoint might need not only the representative Web document, but also the state information corresponding to what the first-endpoint user had selected on both the browser and Web page (i.e., which tab, which button, and so forth). As a second example, to view a password-protected Web page that the user at a first endpoint was viewing, the browser at a second endpoint would need not only the URI for the protected page (i.e., a "deep bookmark"), but also the password information.

In the examples above, the retrieval of a Web document would require knowledge of one or more cookies, or other variable or local information, which the second endpoint might not otherwise have if it were to attempt to retrieve the document using only the URI. Instead, the bookmark server retrieves the document from the document's Web server or from the endpoint that provided the tag-URI pair, possibly with the additional information to be used to reconstruct or gain access to the document. The bookmark server then stores the retrieved document or document-related information, or both, for later use by an endpoint.

A first application of the illustrative embodiment involves a work collaboration scenario, in which two workers are engaged in conversation on their browser-capable, Internet Protocol-based, telephone endpoints. A browser plug-in that is present in the browser at each endpoint enables its user to perform the tag-URI association and to transmit the tag-URI bookmark to the bookmark server. The association can be as simple as typing the tag using the phone's keypad while the Web document of the associated URI is being displayed and then pressing a designated command key. Each worker is able to share the URI through the server by communicating the tag created by one worker at the first endpoint to the other worker at the second endpoint, after having stored the tag-URI bookmark at the server.

A second application of the illustrative embodiment involves a more centralized scenario that features a call center, in which a call center employee at a second endpoint is already engaged in a conversation with a customer at a first endpoint. The call center employee dynamically creates a folder (e.g., a storage file or record, etc.) for the customer; the folder is stored in memory at the bookmark server, which is a server at the call center. A browser plug-in that is present at the first endpoint enables the customer to post URIs or Web documents, or both, to the folder created at the bookmark server to share with the call center employee. A web page that provides a front-end for this collaboration can be generated dynamically for use in the collaboration.

Advantageously, the server of the illustrative embodiment allows the users at associated endpoints to avoid having to type out complex, lengthy URIs. Instead, those users mainly need to enter a relatively short tag conveniently into their keypad, both when associating the URI with the tag and when retrieving the URI from the bookmark server. Furthermore, the server of the illustrative embodiment enables a user at one endpoint to view a snapshot of the Web page that a user at another endpoint was viewing at a particular moment in time, taking into account the particular tab, button, or other navigation option that the viewing user had selected on the browser and on the Web page being shared.

The illustrative embodiment of the present invention comprises: receiving at a first server: i) a first tag and a first Uniform Resource Identifier from a first telecommunications endpoint, wherein the first tag denotes the first Uniform Resource Identifier, and ii) a first request, which comprises a second tag, from a second telecommunications endpoint; and when the second tag matches the first tag, transmitting the first Uniform Resource Identifier to the second telecommunications endpoint.

DETAILED DESCRIPTION

Figure 1:
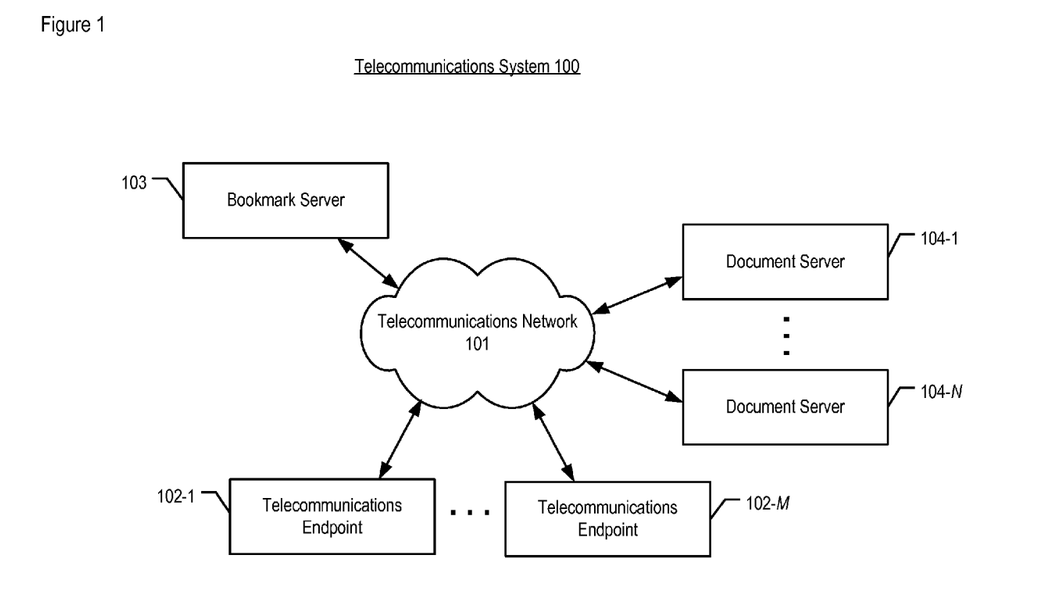
FIG. 1 depicts telecommunications system 100 in accordance with the illustrative embodiment of the present invention.

FIG. 1 depicts telecommunications system 100 in accordance with the illustrative embodiment of the present invention. Telecommunications system 100 comprises telecommunications network 101; telecommunications endpoints 102-1 through 102-M, wherein M is a positive integer; bookmark server 103; and document servers 104-1 through 104-N, wherein N is a positive integer. The depicted elements are interconnected as shown. Telecommunications system 100 is capable of conveying information via the Hypertext Transfer Protocol (HTTP), as part of the Internet Protocol (IP), in accordance with the illustrative embodiment. Nevertheless, it will be clear to those who are skilled in the art, after reading this specification, how to apply the present invention to some alternative embodiments that use other or additional types of protocols, such as File Transfer Protocol (FTP), for the purpose of conveying information.

Telecommunications network 101 is a telecommunications network that comprises the Internet, as well as possibly other subnetworks that operate in accordance with the Internet Protocol or some other protocol. Network 101 comprises or is connected to one or more transmission-related nodes such as gateways, routers, or switches that are used to direct data packets from one or more sources to the correct destinations of those packets. Network 101 is capable of handling HTTP-based messages in well-known fashion, which are transmitted between HTTP-capable processing systems.

Each of telecommunications endpoints 102-m, for m=1 through M, is an HTTP-capable device such as an Internet-protocol telephone, a notebook computer, a personal digital assistant (PDA), a tablet computer, a desktop personal computer, a workstation, and so forth. Each endpoint is capable of originating outgoing sessions (or calls) and receiving incoming sessions (or calls), in well-known fashion. In addition, each endpoint is capable of one or more communication modes that comprise, but are not limited to voice, video, data, email, instant messaging, and chat. As those who are skilled in the art will appreciate, the endpoints can be different from one another—for example, in terms of the device type and the communication modes supported. Those who are skilled in the art will also appreciate that some or all of the endpoints can have different users, some or all can have a common user, or some can have different users while others have a common user.

In accordance with the illustrative embodiment, each endpoint 102-m is a physically distinct device. In some alternative embodiments, two or more endpoints can constitute the same physical device, such as a dual-unit handheld that comprises a WiFi endpoint portion and a cell phone endpoint portion. Each endpoint can use the same network communication protocol, such as WiFi, or can use a different communication protocol (e.g., WiFi, GSM, UMTS, etc.) from one another.

Telecommunications endpoint 102-m comprises a Web browser, which enables the endpoint's user to view and use Web documents such as Web pages and PDF documents, which contain text, images, or other multimedia. The browser enables endpoint 102-m to exchange messages as described below and with respect to FIG. 3, in accordance with the illustrative embodiment of the present invention. In some alternative embodiments, a component other than a browser enables the exchange of messages described below. In any event, it will be clear to those skilled in the art, after reading this specification, how to make and use telecommunications endpoint 102-m.

Bookmark server 103 is a data-processing system that provides a bookmark service to its users, in accordance with the illustrative embodiment. In particular, server 103 is capable of receiving and storing "tags," which are labels that are used to identify Uniform Resource Identifiers (URI) received along with their identifying tags, from one or more telecommunications endpoints in system 100. A Uniform Resource Locator (URL) is a type of URI, as is well-known in the art. Server 103 is also capable of receiving and storing World Wide Web documents, in the event that the URI by itself is insufficient for an endpoint to reconstruct the document. The term "Web document" refers to a representation of a particular resource that is identified by its Uniform Resource Identifier, as is well-known in the art; an example of a Web document is a web page's HyperText Markup Language (HTML) code.

Each tag that server 103 stores corresponds to a URI that the server stores along with the tag as a tag-URI pair, which is also known as a "bookmark" for the purpose of this specification. In some embodiments, server 103 can also store a Web document along with the tag, for some or all of the stored tags. Additionally, server 103 receives requests from one or more telecommunications endpoints in system 100, where each request specifies a tag. Server 103 processes each request by transmitting back to the requesting endpoint either the URI or Web document that corresponds to the tag specified in the request.

In the illustrative embodiment, server 103 operates in accordance with the Hypertext Transfer Protocol. In some alternative embodiments, as those who are skilled in the art will appreciate, server 103 can operate in accordance with a different or additional set of protocols, such as File Transfer Protocol (FTP).

Bookmark server 103 is also capable of retrieving Web documents from (i) at least one of telecommunications endpoints 102-1 through 102-M or (ii) at least one of document servers 104-1 through 104-N, or both. One situation in which server 103 retrieves a Web document is where the URI is insufficient by itself for reconstructing the target Web document at a second endpoint. This is because in addition to a URI, other information is sometimes needed to reconstruct the Web document when fetched by a browser. As an example, if the Web server maintaining the document requires one or more cookies that a second endpoint would not have, the URI might be insufficient by itself to reconstruct the Web document at that second endpoint. As a second example, if the Web server maintaining the document also maintains state information, the URI might be insufficient by itself to reconstruct the Web document at that second endpoint.

As those who are skilled in the art will appreciate, the endpoint that provides the tag-URI pair to bookmark server 103 can also provide the parameter values and other information necessary for describing how to reconstruct the Web document or can, in fact, provide the Web document itself. The additional information can include: the browser state; a locally-executable script, written in JavaScript or another language; the document object model (DOM), as is known in the art; and so forth. Alternatively, the endpoint can at least provide server 103 with an indication that the server will have to retrieve a Web document on behalf of an endpoint that will need the document in the future.

In the illustrative embodiment, bookmark server 103 is depicted as a single server in system 100. However, it will be clear to those skilled in the art, after reading this specification, how to make and use embodiments of the invention in which more than one bookmark server is present. Furthermore, as those who are skilled in the art will appreciate, the bookmark server function can be part of another Web-based server, such as one or more of document servers 104-1 through 104-N. In any event, it will be clear to those who are skilled in the art how to make and use bookmark server 103.

Each of document servers 104-n, for n=1 through N, is a Web server database-processing system that is capable of accepting HTTP requests from Web browser-based clients and of serving those clients with HTTP responses that comprise data contents. The data contents typically are Web documents such as HTML documents and linked objects such as images. For example, document server 104-n can receive, either from telecommunications endpoint 102-m or bookmark server 103, an HTTP request containing a URI that corresponds to a Web document. It will be clear to those who are skilled in the art, after reading this specification, how to make and use document server 104-n.

Figure 2:
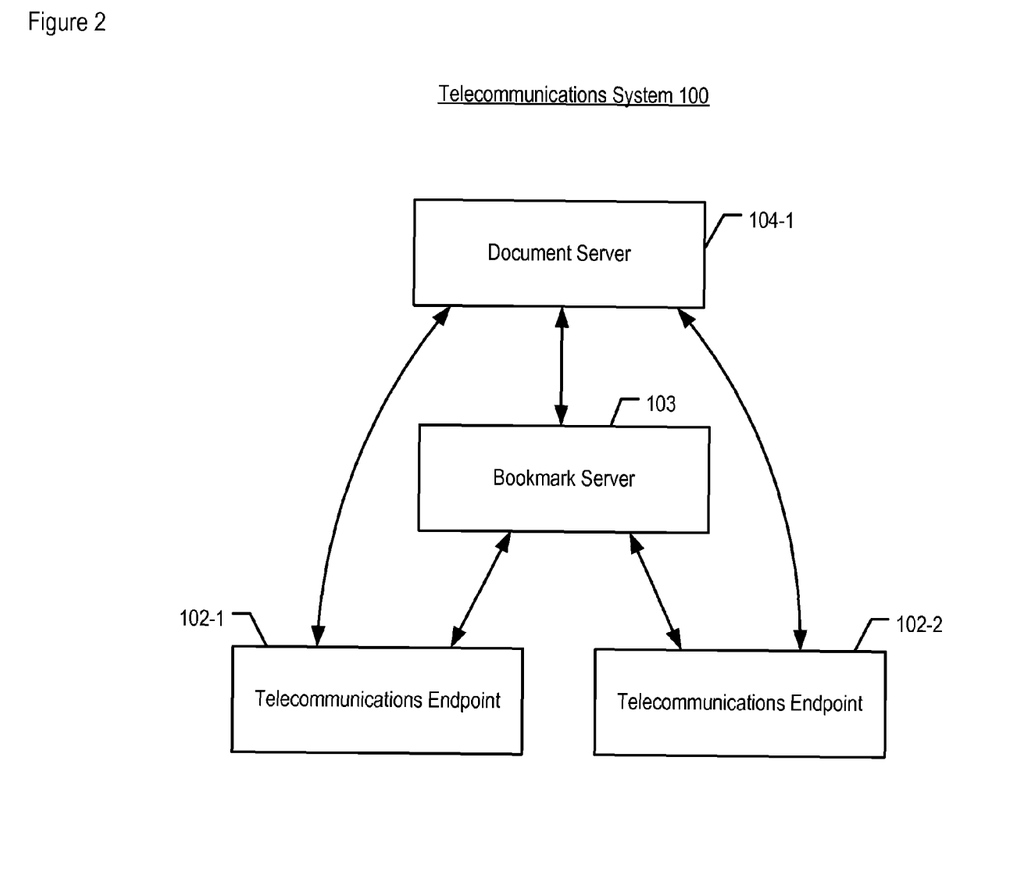
FIG. 2 depicts the logical connections between telecommunications endpoints 102-1 and 102-2, bookmark server 103, and document server 104-1, as part of an illustrative message exchange.
Figure 3:
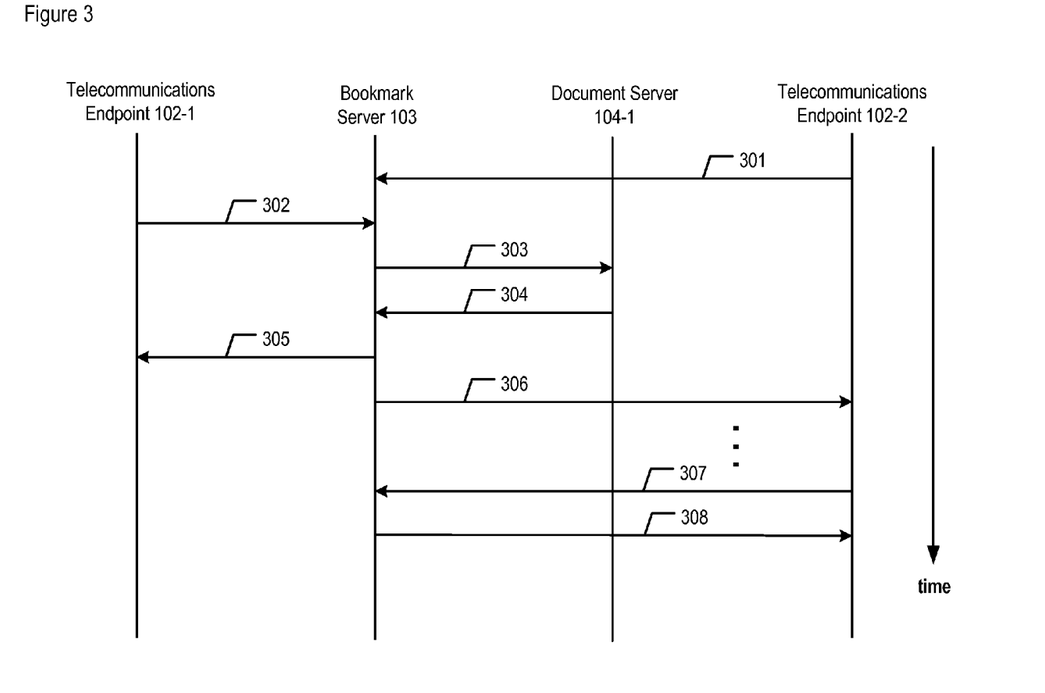
FIG. 3 depicts a message flow diagram of the salient messages exchanged between endpoints 102-1 and 102-2, server 103, and server 104-1, as part of an illustrative message exchange.

FIG. 2 depicts the logical connections between telecommunications endpoints 102-1 and 102-2, bookmark server 103, and document server 104-1, and is intended to serve as a pedagogical tool to better understand an illustrative message exchange between the devices, which exchange will now be discussed. FIG. 3 depicts a message flow diagram of the salient messages exchanged between endpoints 102-1 and 102-2, server 103, and server 104-1, as part of the illustrative message exchange conducted in accordance with the illustrative embodiment of the present invention. Some of the messages that appear in FIG. 3 can be transmitted in parallel or in a different order than that depicted, as those who are skilled in the art will appreciate.

The depicted message flow is that of an illustrative call center scenario, in which a call center employee at endpoint 102-2 is already engaged in a conversation with a customer at endpoint 102-1. The call center employee dynamically creates a folder (e.g., a storage file or record, etc.) for the customer; the folder is stored in memory at bookmark server 103, a call center server. A browser plug-in that is present at endpoint 102-1 enables the customer to post tags that are used to reference URIs or Web documents, to the created folder stored at server 103. By posting the tags, the customer is essentially sharing the target Web document or documents with the call center employee because the employee can use each tag to retrieve the corresponding URI and then use the URI to retrieve the target Web document (i.e., from a Web server). As those who are skilled in the art will appreciate, some embodiments of the present invention enable the call center employee to share documents with the customer (i.e., in the other direction).

To create the folder, endpoint 102-2 transmits message 301 to server 103, which message conveys a request to create the folder. Message 301 contains an identifier of endpoint 102-1. Server 103 receives the message and creates the folder for endpoint 102-1.

The customer at endpoint 102-1 is then notified that the folder has been created, either by verbal confirmation from the call center employee or by receiving a message from either endpoint 102-2 or server 103. Until this point, the customer at endpoint 102-1 has possibly been accumulating URIs or Web documents, from document server 104-1 or from another Web server, on the Internet or on some other network (e.g., private Intranet, etc.). Once the customer has been notified of the folder's creation, the customer can start sharing URIs and documents with the call center employee. To initiate the sharing, endpoint 102-1 transmits message 302 which contains a first tag and a corresponding first URI.

For example, the customer at endpoint 102-1 might want to share with the employee at endpoint 102-2 the URI for the Customer Support Web page of ABC Company, in order to verify that the customer is at the correct Web page. The URI in this example is http://support.abc_company.com/en/go/custsupport?PAGE=Home. The URI itself is too complex for endpoint 102-1's user to type out and send to endpoint 102-2.

Instead, the user thinks of a tag to represent the URI in a shortened format, perhaps one that is descriptive of the URI such as "support", and has the browser plug-in at endpoint 102-2 transmit the tag-URI pair to server 103.

Bookmark server 103 receives the tag-URI pair and determines if a browser at endpoint 102-2 would be able to reconstruct a Web document, if it were to request a Web document using the URI in the pair. If it would not be able to reconstruct the document—for example, because endpoint 102-2 does not have one or more of the necessary cookies—server 103 instead transmits message 303 to document server 104-1, along with the necessary cookies, as provided by either endpoint 102-1 or server 103 itself.

Bookmark server 103 then receives the Web document via message 304 from document server 104-1. Server 103 stores the Web document along with the tag-URI pair and transmits confirmation to endpoint 102-1, in the form of message 305. The received Web document is now readable by endpoint 102-2's browser because server 103 provided the necessary additional information (e.g., cookies, etc.) to document server 104-1.

In a variation of the example, bookmark server 103 retrieves the Web document from endpoint 102-1, as well as possibly additional information that server 103 can use to recreate not only the displayable Web document but also the exact state of the Web document or browser (in terms of the browser tab selected, the navigation button pressed, and so forth) when the customer at endpoint 102-1 chose to share the document.

As those are skilled in the art will appreciate, it is preferential from a storage perspective that server 103 stores the tag-URI pair and not additionally the target Web document or other information. However, it will be necessary at times to store the Web document or related parameter values used for reconstructing the document, or both—such as when a browser at another endpoint would have problems retrieving and reconstructing the Web document by using only the URI.

The customer at telecommunications endpoint 102-1 might choose to transmit to server 103 additional tags that are used to reference additional URIs and Web documents, for the purpose of sharing the additional tags—and, therefore, documents—with the call center employee at endpoint 102-2. Alternatively, the customer might choose to transmit tags to server 103 for the purpose of sharing the tags with users at endpoints other than 102-2. Furthermore, users at either endpoint 102-2 or other telecommunications endpoints might want to create folders for the purpose of sharing tags, either with the customer at endpoint 102-1 or with users at other endpoints. It will be clear to those skilled in the art, after reading this specification, how to make and use embodiments of the present invention for the purpose of sharing tags among any combination of endpoints in telecommunications system 100.

The call center employee at endpoint 102-2 is to be provided with the tag that he or she may conveniently use to retrieve the corresponding URI at a later time from bookmark server 103. In accordance with the illustrative embodiment, bookmark server 103 provides the tag to endpoint 102-2 via message 306. In some alternative embodiments endpoint 102-1, instead of server 103, can provide the tag to endpoint 102-2.

Later, the employee at endpoint 102-2 may request a Web document that is of relevance to the customer at endpoint 102-1. First, endpoint 102-2 transmits request message 307 that requests the URI that corresponds to the tag specified in the request.

Second, when bookmark server 103 receives the request, it matches the tag received in the request with the stored tags. If a Web document is available that corresponds to a stored tag matched against the requested tag, bookmark server 103 transmits the Web document to endpoint 102-2. Otherwise, server 103 transmits the corresponding stored URI to endpoint 102-2, as part of message 308.

Endpoint 102-2 is then able to use the URI, if the Web document itself had not been received from server 103, to retrieve the Web document from a Web-based server in telecommunications system 100. For example, if the URI points to a document that happens to be kept on document server 104-1, endpoint 102-2 can retrieve the document from that server by specifying the URI, in well-known fashion.

FIGS. 4 through 7 depict flowcharts of the salient tasks that are executed by bookmark server 103, in accordance with the illustrative embodiment of the present invention. The salient tasks in FIG. 4 pertain to the receiving and processing of information—for example, from a telecommunications endpoint that provides a tag and URI or from an endpoint that requests a Web document by specifying a tag that had been created earlier. In the descriptions that follow telecommunications endpoint 102-1 is a first endpoint and endpoint 102-2 is a second endpoint. Some of the tasks that appear in FIGS. 4 through 7 can be performed in parallel or in a different order than that depicted, as those who are skilled in the art will appreciate.

Figure 4:
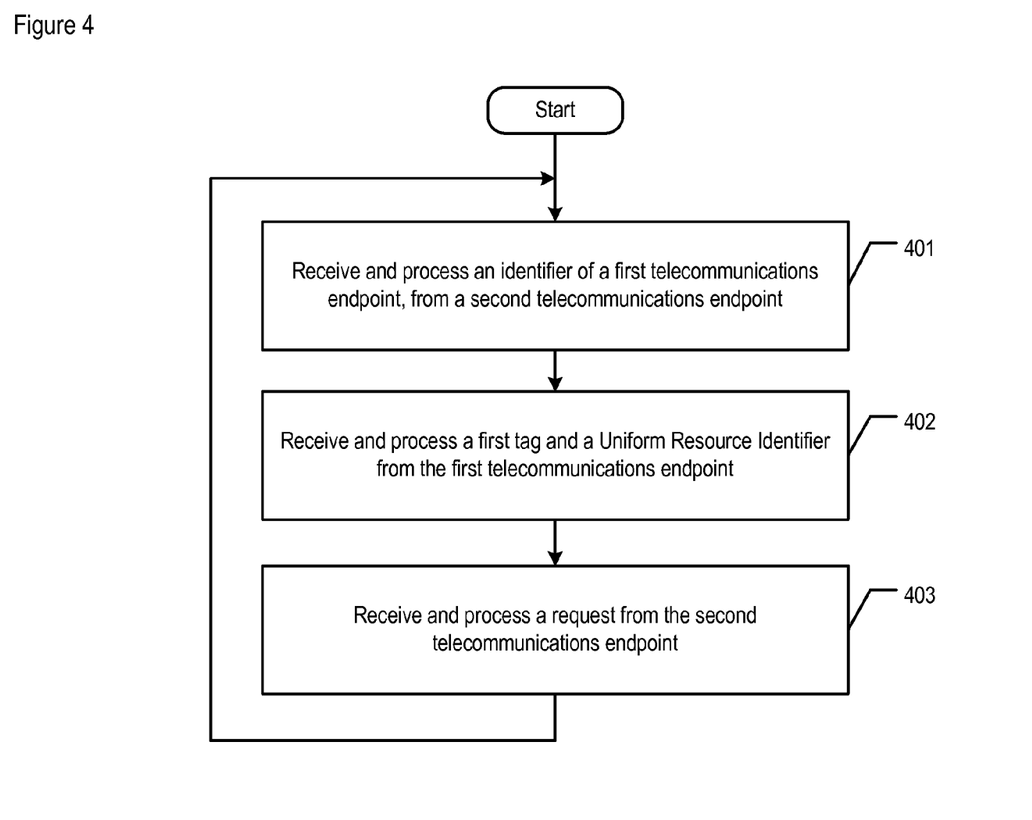
FIG. 4 depicts a flowchart of the salient tasks that pertain to the receiving and processing of information at bookmark server 103.

Referring to FIG. 4, at task 401, bookmark server 103 receives and processes an identifier of first endpoint 102-1. Server 103 receives the identifier from second endpoint 102-2. The identifier is part of message 301, which requests that a folder be created. As those who are skilled in the art will appreciate, after reading this specification, some alternative embodiments of the present invention can be made and used such that an identifier is not received from a second endpoint and a folder is not subsequently created for the identifier that represents an endpoint. The subtasks of task 401 are described in detail below and with respect to FIG. 5.

At task 402, server 103 receives and processes a first tag and URI from first endpoint 102-1. The subtasks of task 402 are described below and with respect to FIG. 6.

At task 403, server 103 receives and processes a request from second endpoint 102-2, such as the request contained in message 307. The salient subtasks of task 403 are described below and with respect to FIG. 7.

After task 403, task execution proceeds back to task 401 so that server 103 is able to process additional folder creation requests, tag-URI pairs, and requests for URIs received from various endpoints.

Figure 5:
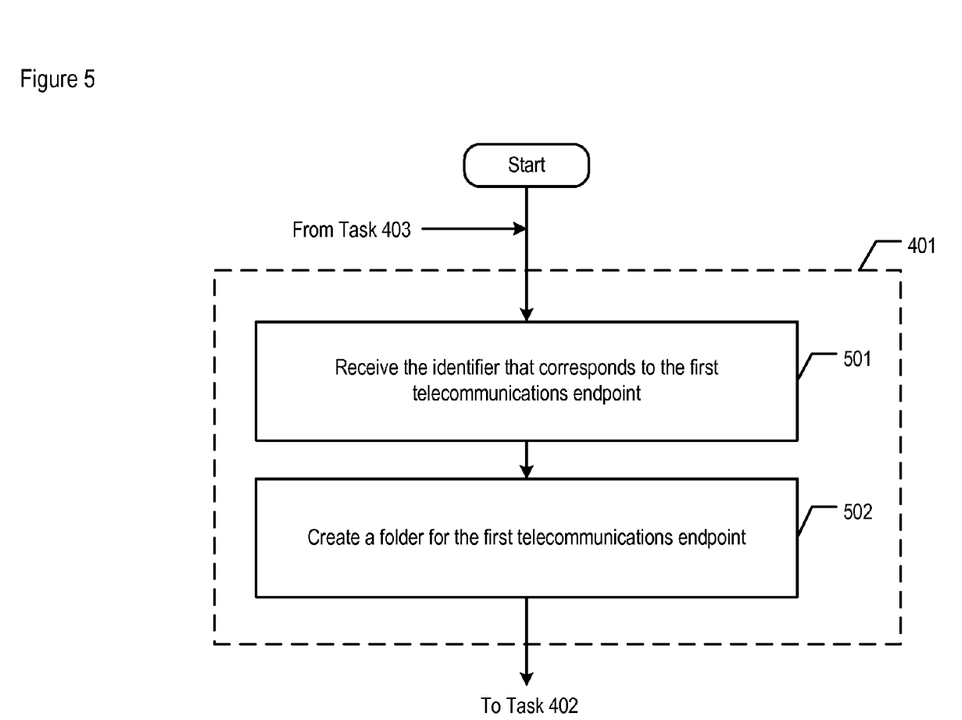
FIG. 5 depicts a flowchart of the salient tasks that are executed by server 103 in processing an endpoint identifier.

FIG. 5 depicts a flowchart of the salient tasks that are executed by bookmark server 103 in processing an endpoint identifier, in accordance with the illustrative embodiment of the present invention. The identifier is of a first endpoint that will be sharing tags that correspond to URIs with a second endpoint or other endpoints, or both. As those who are skilled in the art will appreciate, first endpoint 102-1 can share its tags with the endpoint that transmits the identifier (e.g., endpoint 102-2, etc.) or with other endpoints in system 100.

At task 501, server 103 receives an endpoint identifier from second endpoint 102-2, in which the identifier specifies first endpoint 102-1.

At task 502, and in response to receiving the identifier, server 103 creates a folder in memory to store tag-URI pairs received from first endpoint 102-1, as well as any Web documents received that correspond to the tags received from endpoint 102-1. After task 502, task execution proceeds to task 402.

Figure 6:
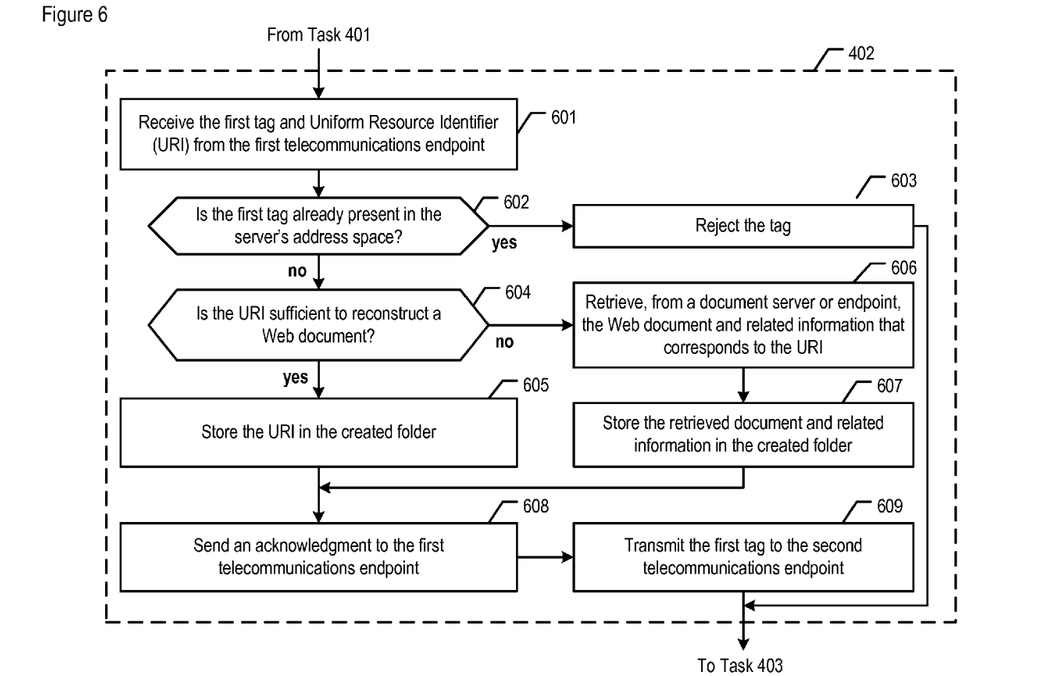
FIG. 6 depicts a flowchart of the salient tasks that are executed by server 103 in processing a tag-URI pair.

FIG. 6 depicts a flowchart of the salient tasks that are executed by bookmark server 103 in processing a tag-URI pair, in accordance with the illustrative embodiment of the present invention.

At task 601, server 103 receives a first tag and a URI from first endpoint 102-1. For example, using the example provided earlier and with respect to FIG. 3, the user of endpoint 102-1 might want to share with the user of endpoint 102-2 the URI for Customer Support of ABC Company. The URI in this example is http://support.abc_company.com/en/go/custsupport?PAGE=Home. The URI itself is too complex for endpoint 102-1's user to type out and send to endpoint 102-2. Instead, the user thinks of a tag to represent the URI in a shortened format, perhaps one that is descriptive of the URI such as "support", and has the browser plug-in at endpoint 102-2 transmit the tag-URI pair to server 103.

At task 602, server 103 checks if the received tag is already in use as a label for another URI at the server—that is, it determines if the tag is already present in the server's address space. If the tag is in the server's address space, task execution proceeds to task 603. If the tag is not in the server's address space, task execution proceeds to task 604.

At task 603, server 103 rejects the tag—for example, by sending a rejection message back to endpoint 102-1. Task execution then proceeds to task 403.

At task 604, server 103 checks if the URI is sufficient for a future user of the URI to reconstruct a Web document to which the URI points. As a first example, server 103 might rely on receiving an indication from endpoint 102-1 as to whether the URI is sufficient by itself, the reception being the result of endpoint 102-1 having decided on the URI's sufficiency. As a second example, server 103 might actually try using the URI, in a manner as if the server were an endpoint, to see if the target document server returns a sufficiently reconstructed Web document. As a third example, either endpoint 102-1 or server 103 can examine the header information in a received HTTP message from the target document server; in accordance with the illustrative embodiment, the header could have been coded ahead of time to indicate whether the accompanying Web document can be bookmarked as is. If the URI is insufficient by itself, task execution proceeds to task 606. If it is sufficient, however, task execution proceeds to task 605.

At task 605, server 103 stores the tag and corresponding URI in the folder created at task 502. This scenario applies, for example, when the Web document pointed to by the URI is represented by one or more files of static content within the host document server's file system; in other words, an endpoint would be able to retrieve the Web document at a later time by using only the URI. In some alternative embodiments where no folder has been created or will be created, the tag and URI are stored in general memory, with or without an indication of the endpoint that provided the current tag-URI pair, in this case endpoint 102-1. Task execution then proceeds to task 608.

At task 606, server 103 retrieves, from document server 104-n, the Web document that corresponds to the URI received from first endpoint 102-1. To retrieve the document, server 103 might have to provide information not contained in the URI, such as information contained in one or more cookies or state information.

In some alternative embodiments, server 103 retrieves from endpoint 102-1 (i) the Web document that corresponds to the URI and (ii) possibly additional information for reconstructing the Web document as was viewed on endpoint 102-1's browser. This scenario applies, for example, when (i) the Web document pointed to by the URI is represented by one or more files of dynamic content (e.g., dynamic Web pages, etc.) or (ii) client-side scripting is used with the particular Web document, or both.

At task 607, server 103 stores the retrieved Web document or the document reconstruction information (or both) in the folder created at task 502, along with the tag and possibly the URI. In some alternative embodiments where no folder has been created or will be created, the Web document and information are stored in general memory, along with the tag and possibly the URI, with or without an indication of the endpoint that provided this tag-URI pair, in this case endpoint 102-1.

At task 608, server 103 transmits an acknowledgment to first endpoint 102-1 that the tag and URI—as well as the Web document or additional information, if retrieved—have been stored successfully.

At task 609, server 103 transmits the newly-stored tag to a second endpoint—for example, endpoint 102-2. In some alternative embodiments, it is up to first endpoint 102-1 to transmit the tag to the second endpoint so that the second endpoint's user will be able to specify the tag to retrieve a URI, in order to ultimately retrieve a Web document. After task 609, task execution then proceeds to task 403.

Figure 7:
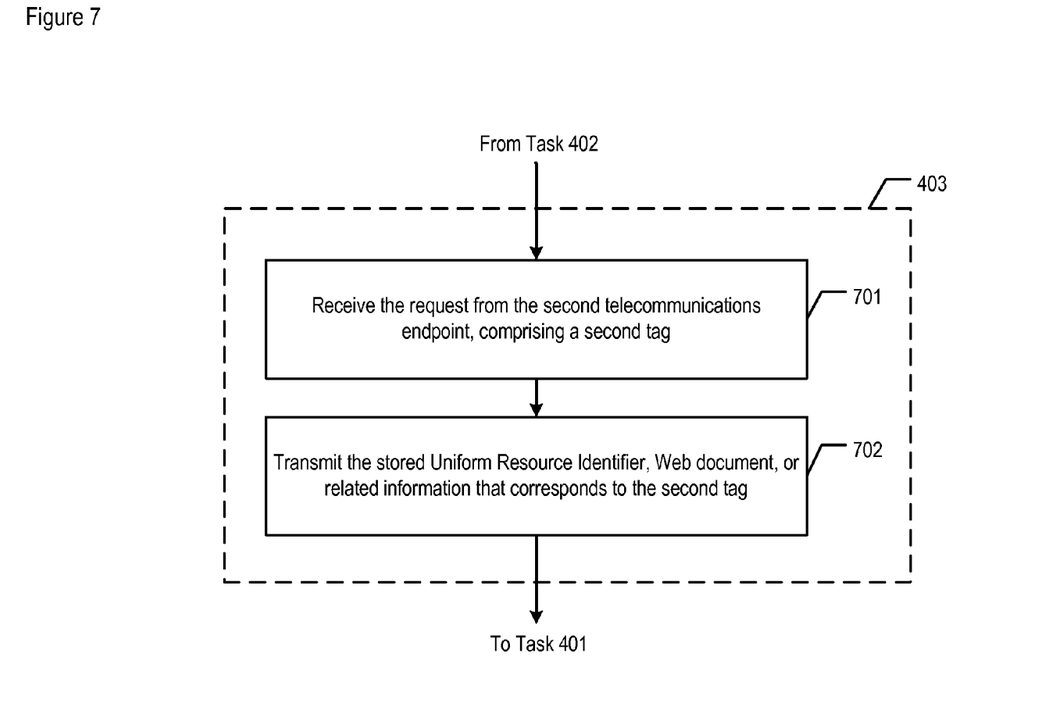
FIG. 7 depicts a flowchart of the salient tasks that are executed by server 103 in processing a request that contains a tag.

FIG. 7 depicts a flowchart of the salient tasks that are executed by bookmark server 103 in processing a request that contains a tag, where the request is for a URI, in accordance with the illustrative embodiment of the present invention.

At task 701, bookmark server 103 receives a request, which comprises a specified tag, from second endpoint 102-2. In other words, the user of endpoint 102-2 has specified that the user wants the URI that corresponds to the tag received by server 103. In some alternative embodiments, bookmark server 103 instead receives a request that comprises the actual URI of the Web document of interest.

At task 702, server 103 transmits the stored URI that corresponds to the tag received from endpoint 102-2. If server 103 has already retrieved the Web document or document reconstruction information that corresponds to the URI, the server instead transmits the Web document or reconstruction information, or both, to endpoint 102-2, with or without the URI. After task 702, task execution then proceeds back to task 401.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, via a computer network and from a first endpoint associated with a first user, digital data comprising a tag and a uniform resource identifier identifying a document located on a document server at a computer network address corresponding to the uniform resource identifier, wherein the tag is uniquely linked with the uniform resource identifier and with no other uniform resource identifiers such that a request for the tag provides the document by forwarding the uniform resource identifier;
   upon determining that a second web browser associated with a second endpoint would not be able to reconstruct the document, receiving, via the computer network and from the first endpoint, a parameter describing how to reconstruct the document, wherein the parameter comprises at least one of (i) a password required to retrieve the document from the document server, (ii) state information corresponding to what the first user has selected on a first web browser associated with the first endpoint while the first user is viewing the document via the first web browser, (iii) information contained in a cookie required to retrieve the document from the document server, (iv) a locally executable script associated with the document, or (v) a document object model associated with the document; and upon determining that the tag is unique in an address space for tags:
 retrieving the document by using the parameter to yield a retrieved document;
 storing, via a processor, the tag, the retrieved document, and the uniform resource identifier in a folder specific to the first user, wherein the folder is accessible only to the first user and members of a designated organization;
 receiving, by the processor, a request from the second endpoint associated with a second user who is a member of the designated organization, the request comprising text; and
 when the text matches the tag, transmitting, by the processor, the uniform resource identifier and the retrieved document to the second endpoint.

2. The method of claim 1, wherein the tag is a first tag, the method further comprising:
 receiving a second tag from the first user;
 determining whether the second tag already exists within the address space for tags; and
 when the second tag already exists within the address space, transmitting a rejection to the first user.

3. The method of claim 1, wherein the document is retrieved from the first endpoint, the document originating from a web server.

4. The method of claim 3, further comprising:
 determining whether the uniform resource identifier is sufficient to reconstruct the document; and
 when the uniform resource identifier is insufficient to reconstruct the document, requesting the parameter from the first endpoint.

5. The method of claim 1, further comprising:
 receiving, from the first endpoint, a plurality of parameters describing how to reconstruct the document, wherein the plurality of parameters comprises (i) the password required to retrieve the document from the document server, (ii) the state information corresponding to what the first user has selected on the web browser associated with the first endpoint while the first user is viewing the document via the web browser, (iii) the information contained in the cookie required to retrieve the document from the document server, (iv) the locally executable script associated with the document, and (v) the document object model associated with the document,
 wherein the document is retrieved by further using the plurality of parameters.

6. The method of claim 1, wherein a browser plugin allows the first user to post tags to the folder.

7. The method of claim 1, wherein the first user is a customer and the second user is a call center employee.

8. The method of claim 1, wherein the folder specific to the first user is created upon receiving the tag and the uniform resource identifier.

9. The method of claim 1, further comprising:
 storing the parameter in the folder.

10. A system comprising:
 a computer processor; and
 a computer memory storing instructions which, when executed by the processor, cause the processor to perform operations comprising:
  receiving, from a first endpoint associated with a first user, a tag and a uniform resource identifier identifying a document located on a document server at an address corresponding to the uniform resource identifier, wherein the tag is uniquely linked with the uniform resource identifier and with no other uniform resource identifiers such that requests for the tag provides the document by forwarding the uniform resource identifier;
  upon determining that a second web browser associated with a second endpoint would not be able to reconstruct the document, receiving, from the first endpoint, a parameter describing how to reconstruct the document, wherein the parameter comprises at least one of (i) a password required to retrieve the document from the document server, (ii) state information corresponding to what the first user has selected on a web browser associated with the first endpoint while the first user is viewing the document via the web browser, (iii) information contained in a cookie required to retrieve the document from the document server, (iv) a locally executable script associated with the document, or (v) a document object model associated with the document; and
  upon determining that the tag is unique in an address space for tags:
   retrieving the document by using the parameter to yield a retrieved document;
   storing the tag, the retrieved document, and the uniform resource identifier in a folder specific to the first user, wherein the folder is accessible only to the first user and to members of a designated organization;
   receiving a request from a second endpoint associated with a second user who is a member of the designated organization, the request comprising text; and
   when the text matches the tag, transmitting the uniform resource identifier and the retrieved document to the second endpoint.

11. The system of claim 10, wherein the first user is a customer and the second user is a call center employee.

12. The system of claim 10, wherein the folder specific to the first user is created upon receiving the tag and the uniform resource identifier.

13. The system of claim 10, the computer-readable storage medium storing additional instructions which, when executed by the processor, cause the processor to perform further operations comprising:
 storing the parameter in the folder.

14. The system of claim 10, wherein the tag is a first tag, the computer-readable storage medium storing additional instructions which, when executed by the processor, cause the processor to perform further operations comprising:
 receiving a second tag from the first user;
 determining whether the second tag already exists within the address space for tags; and
 when the second tag already exists within address space, transmitting a rejection to the first user.

15. The system of claim 10, wherein the document is retrieved from the first endpoint, the document originating from a web server.

16. The system of claim 15, the computer-readable storage medium storing additional instructions which, when executed by the processor, cause the processor to perform further operations comprising:

receiving, from the first endpoint, a plurality of parameters describing how to reconstruct the document, wherein the plurality of parameters comprises (i) the password required to retrieve the document from the document server, (ii) the state information corresponding to what the first user has selected on the web browser associated with the first endpoint while the first user is viewing the document via the web browser, (iii) the information contained in the cookie required to retrieve the document from the document server, (iv) the locally executable script associated with the document, and (v) the document object model associated with the document, wherein the document is retrieved by further using the plurality of parameters.

17. The system of claim 16, the computer-readable storage medium storing additional instructions which, when executed by the processor, cause the processor to perform further operations comprising:

determining whether the uniform resource identifier is sufficient to reconstruct the document; and when the uniform resource identifier is insufficient to reconstruct the document, requesting the parameter from the first endpoint.

18. A computer-readable storage device storing instructions which, when executed by a processor, cause the processor to perform operations comprising:

receiving, from a first endpoint associated with a first user, a tag and a uniform resource identifier identifying a document located on a document server at an address corresponding to the uniform resource identifier, wherein the tag is uniquely linked with the uniform resource identifier and with no other uniform resource identifiers such that requests for the tag provides the document by forwarding the uniform resource identifier;

upon determining that a second web browser associated with a second endpoint would not be able to reconstruct the document, receiving, from the first endpoint, a parameter describing how to reconstruct the document, wherein the parameter comprises at least one of (i) a password required to retrieve the document from the document server, (ii) state information corresponding to what the first user has selected on a web browser associated with the first endpoint while the first user is viewing the document via the web browser, (iii) information contained in a cookie required to retrieve the document from the document server, (iv) a locally executable script associated with the document, or (v) a document object model associated with the document; and upon determining that the tag is unique in an address space for tags:

retrieving the document by using the parameter to yield a retrieved document;

storing the tag, the retrieved document, and the uniform resource identifier in a folder specific to the first user, wherein the folder is accessible only to the first user and to members of a designated organization;

receiving a request from a second endpoint associated with a second user who is a member of the designated organization, the request comprising text; and when the text matches the tag, transmitting the uniform resource identifier and the retrieved document to the second endpoint.

19. The computer-readable storage device of claim 18, wherein the folder specific to the first user is created upon receiving the tag and the uniform resource identifier.

20. The computer-readable storage device of claim 18, having additional instructions stored which result in operations comprising:

storing the parameter in the folder.

* * * * *